Nov. 16, 1971     KINGO SAWADA ET AL     3,619,888
AUTOMATIC BEARING PRESS-FIT MACHINE
Filed Feb. 20, 1970     9 Sheets-Sheet 1

FIG. 1

INVENTORS.
KINGO SAWADA,
SHOICHI KATO,
TADASHI OTA,

BY Berman, Davidson & Berman,
ATTORNEYS

INVENTORS.
KINGO SAWADA,
SHOICHI KATO,
TADASHI OTA,

United States Patent Office 3,619,888
Patented Nov. 16, 1971

3,619,888
AUTOMATIC BEARING PRESS-FIT MACHINE
Kingo Sawada, Kariya, Shoichi Kato, Hekikai, and Tadashi Ota, Okazaki, Japan, assignors to Toyoda Koki Kabushiki Kaisha, Kariya-shi, Aichi-ken, Japan
Filed Feb. 20, 1970, Ser. No. 12,975
Claims priority, application Japan, Dec. 28, 1969, 44/505
Int. Cl. B23p *19/00, 19/04*
U.S. Cl. 29—208
9 Claims

ABSTRACT OF THE DISCLOSURE

An automatic bearing press-fit machine including bearing indexing means for indexing the oil hole of a bearing in a predetermined angular position, bearing inserting means for inserting the bearing indexed by the indexing means into the bore of a workpiece in press-fit relationship, and bearing position-ensuring means for ensuring the alignment of the oil hole of the bearing inserted into the bore of the workpiece with respect to that of the workpiece.

BACKGROUND OF THE INVENTION

The present invention relates to bearing press-fit machines, and more particularly to an automatic bearing press-fit machine comprising bearing indexing means for indexing the oil hole of a bearing in a predetermined angular relationship, bearing inserting means for inserting the bearing indexed by the indexing means into the bore of a workpiece in a press-fit relationship, and bearing position-ensuring means for ensuring the correct alignment of the oil hole of the bearing inserted into the bore of the workpiece with respect to that of the workpiece.

The workpiece, such as a cylinder block of a vehicle, has bores in which bearings are inserted in a press-fit relationship for supporting a cam shaft. Each of the bearings has an oil hole which serves to supply lubricant between the bearings and the associated cam shaft. Thus, the cylinder block has oil holes opening at the bores thereof and being intended to register with the oil holes of the bearings.

Each of the bearings of this kind is usually inserted into each of the bores of the workpiece by means of a press-fit machine. The important objective is to align the oil hole of the bearing with that of the workpiece. No known press-fit machine automatically obtains this alignment. The operation of indexing the oil hole of the bearing in a predetermined angular direction associated with that of the oil hole of the workpiece has been manually performed by the operator. This manual and difficult operation of indexing the oil hole of the bearing is very inefficient, and rapid and accurate performance of this operation cannot be obtained.

SUMMARY OF THE INVENTION

It is, therefore, an object of the invention to provide an automatic bearing press-fit machine which performs a rapid and accurate bearing-inserting operation.

Another object of the invention is to provide an automatic bearing press-fit machine which lessens the labor or the operator.

A further object of the invention is to provide an automatic bearing press-fit machine which comprises bearing indexing means for indexing the oil hole of the bearing in a predetermined angular relationship, bearing inserting means for inserting the bearing indexed by the indexing means into the bore of the associated workpiece in a press-fit relationship, and bearing position-ensuring means for ensuring the alignment of the oil hole of the bearing inserted into the bore of the workpiece with respect to that of the workpiece.

BRIEF DESCRIPTION OF THE DRAWINGS

The foregoing and other objects of the present invention will become fully apparent from the following description of some preferred embodiments of the present invention with reference to the accompanying drawings, in which.

DESCRIPTION OF THE INVENTION

Figure 1:
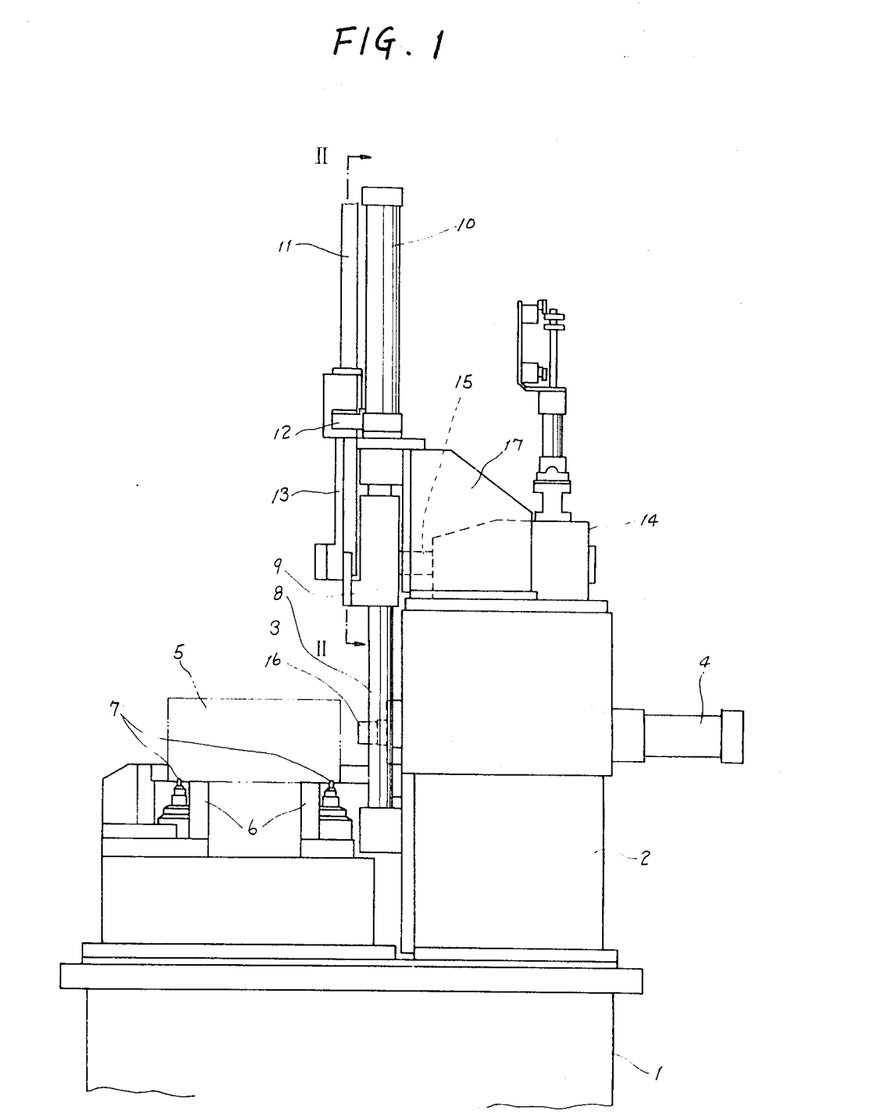
FIG. 1 is a side elevational view of an automatic bearing press-fit machine according to the present invention.

Referring now to FIG. 1, the reference numeral 1 indicates a bed having thereon a column 2. Horizontally mounted in the column 2 is a slidable press shaft 3 which is moved by a hydraulic actuator 4 secured to the column 2. A workpiece 5 in which a bearing 25 is to be inserted in a press-fit relationship is precisely located opposite to the press shaft 3 on reference blocks 6 by locating pins 7 and is clamped by a clamping mechanism (not shown). A bearing receiving block 9 is slidably engaged on and guided by a shaft 8. The ends of the shaft 8 are secured to the column 2 and a bracket 17 mounted on the column 2, respectively. Block 9 is connected to and shifted by a hydraulic actuator 10 from an indexing position to an inserted position, and vice versa. One of a stack of bearings 25 stored in a chute 11 is received in and shifted by the movement of a conveying plate 12 to a position aligned with the receiving portion 9 and is dropped through a guide 13 to the receiving portion 9 in its indexing position. The bearing 25 received in the receiving portion 9 is rotated more than one revolution by an indexing shaft 15 mounted in an indexing housing 14 mounted on the colunm 2, so that the oil hole of the bearing 25 is indexed in a predetermined angular position associated with the position of the oil hole of the intended workpiece 5. After the completion of indexing the oil hole of the bearing 25, the receiving block 9 is shifted down by the hydraulic actuator 10 from its indexing position to its inserting position so that the bearing 25 in the receiving portion is aligned with the bore of the intended workpiece 5 and the press shaft 3. Then, the press shaft 3, having at its working end a press head 16, is moved toward the bearing 25 by the actuation of the hydraulic actuator 4 to hold the bearing 25 and is further moved toward the workpiece 5 to insert the bearing 25 thereinto in a press-fit relationship.

Referring to FIGS. 2 to 5 inclusive, the bearing supply mechanism comprising the conveying plate 12 and the indexing mechanism having the indexing shaft 15 will be described in detail.

Figure 2:
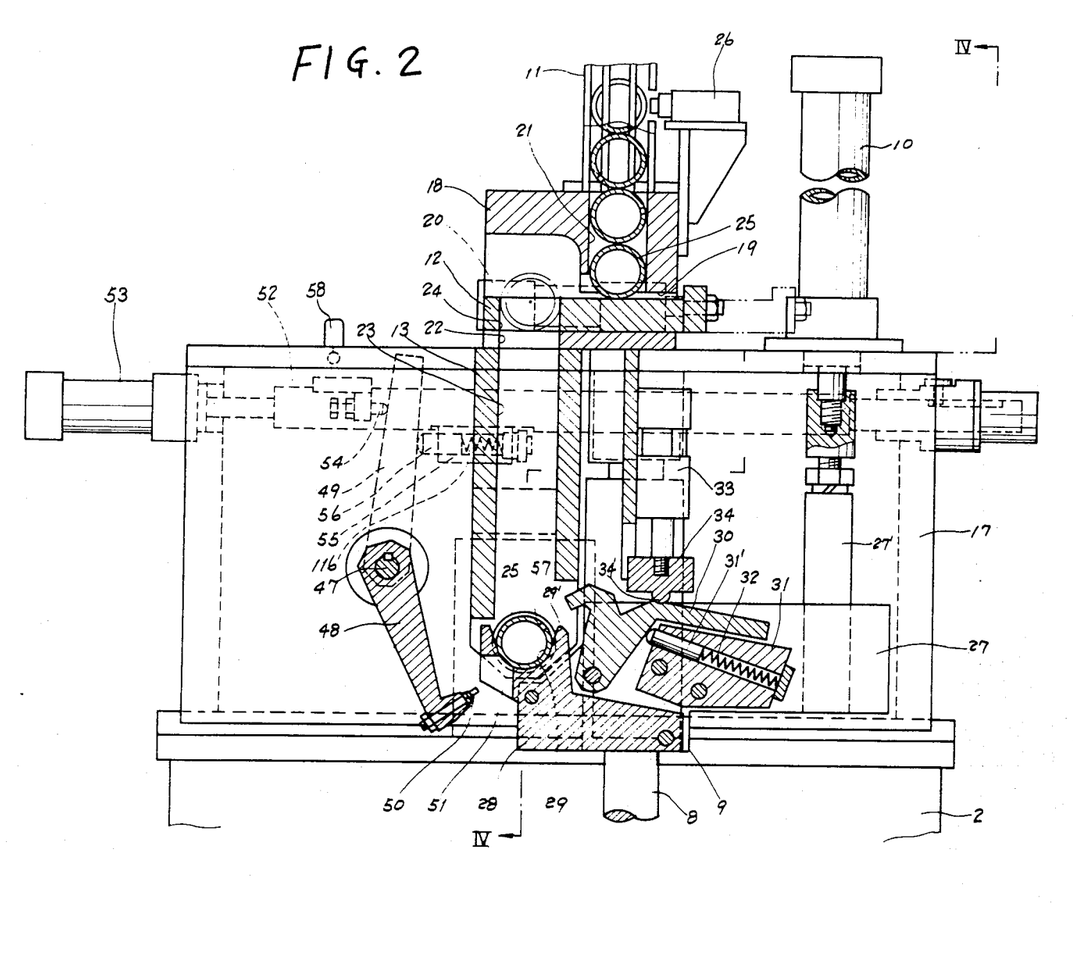
FIG. 2 is a sectional view to an enlarged scale taken along the line 2—2 of FIG. 1.

In FIG. 2, the column 2 has thereon the bracket 17 on which a block 18 is fixedly mounted. The block 18 has a lateral recess 19 in which the conveying plate 12 is slidably mounted. The conveying plate 12 is connected at one end to and is laterally shifted by a hydraulic actuator 20 mounted on the bracket 17. The block 18 has a vertical recess 21, the upper portion of which is connected to the chute 11, and the lower portion of which opens at the upper surface of the plate 12. The block 18 also has a spaced and vertical recess 22, the upper portion of which opens at the lower surface of the plate 12, and the lower portion of which is communicatively connected to a passage 23 in the guide 13. The conveying plate 12 has a conveying hole 24 and thus, when the plate 12 is shifted to the right from the position shown in FIG. 2 by the operation of the hydraulic actuator 20, hole 24 is aligned with the recess 21 of the block 18 so that one of the bearings carried in the plate 12 is inserted in the hole 24. Thereafter, when the conveying plate 12 is shifted to the left position, shown in FIG. 2, the hole 24 is aligned with the recess 22 of the block 18 so that the bearing 25 drops down through the recess 22 and the passage 23 in the guide 13. At this time, the next bearing 25 is stored in the recess 21 of the block 18 in engagement with the upper surface of the plate 12. Therefore, one reciprocating movement of the plate 12 by the hydraulic actuator 20 serves to supply one bearing 25 from the recess 21 of the block 18 to the passage 23 of the guide 13. At the mid-portion of the chute 11 is located a proximity switch 26 which ensures that a predetermined number of bearings are accommodated in the chute 11.

Figure 3:
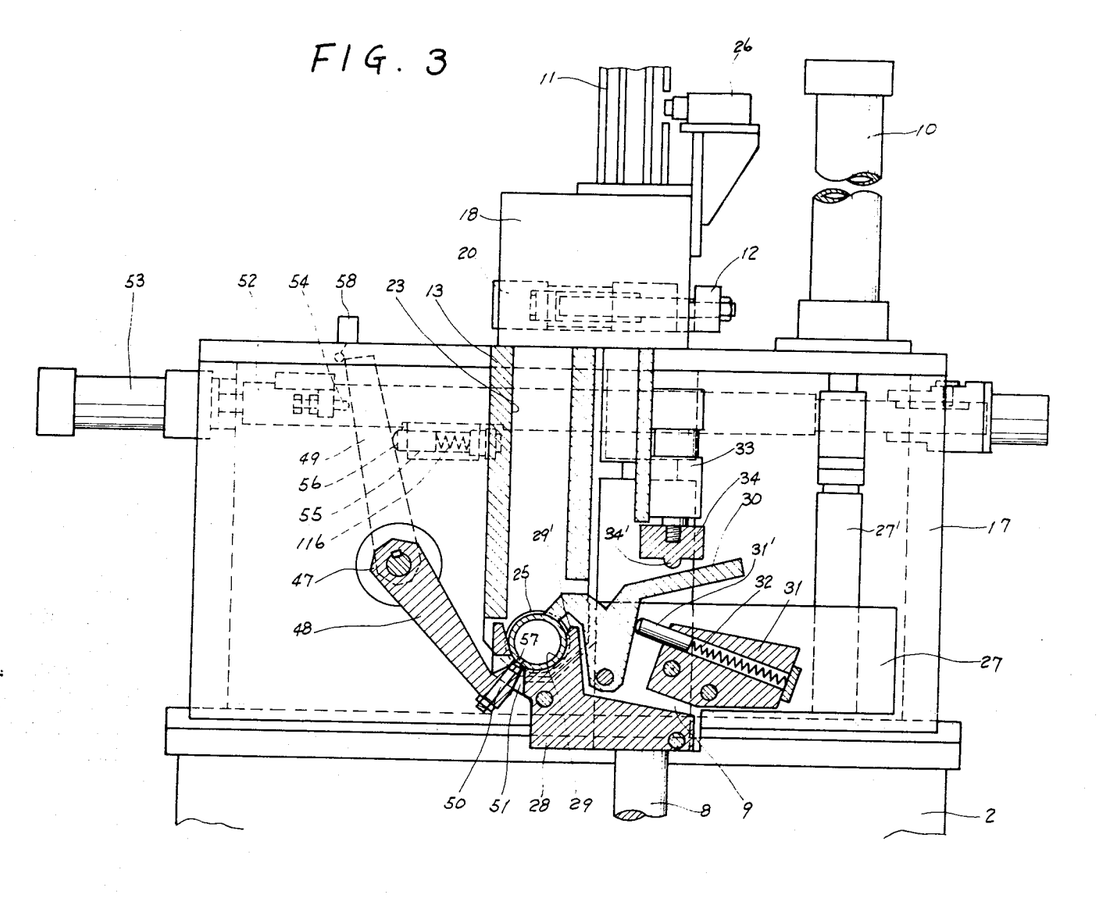
FIG. 3 is a view showing the completion of the indexing operation in FIG. 2.

As previously mentioned, the bearing receiving block 9 is guided by the shaft 8, the upper and lower portions of which are respectively secured to the bracket 17 and the column 2. The block 9 has at one side thereof a plate 27 which is connected at one end thereof to the piston of the hydraulic actuator 10 by a connecting arm 27'. The plate 27 has at its other end a plate 28 having a bearing seat 29 aligned with the passage 23 in the guide 13. Therefore, when a bearing 25 drops down through the passage 23, the bearing is received on the bearing seat 29 in its indexing position shown in FIG. 2. A clamp arm 30 is pivotally connected to the plate 27. A plate 31 is secured to the plate 27 and has therein a slidable plunger 31' biased outwardly by a compressed spring 32 with a relatively small spring constant. Under the force of the spring 32, the clamp arm 30 is urged by the plunger 31' in a direction to clamp the bearing 25 (FIG. 3). The counterclockwise movement of the clamp arm 30 is limited by the tip 29' of the receiving seat 29. A hydraulic actuator 33 is secured to the front wall of the bracket 17. The piston rod of the actuator 33 is connected to one end of a pusher 34. The other end of the pusher 34 has a projection 34' engaging with the clamp arm 30. Thus, the operation of the actuator 33 causes the pusher 34 to urge the clamp arm 30 clockwise against the force of spring 32 in a direction to unclamp the bearing (FIG. 2).

Figures 4, 5:
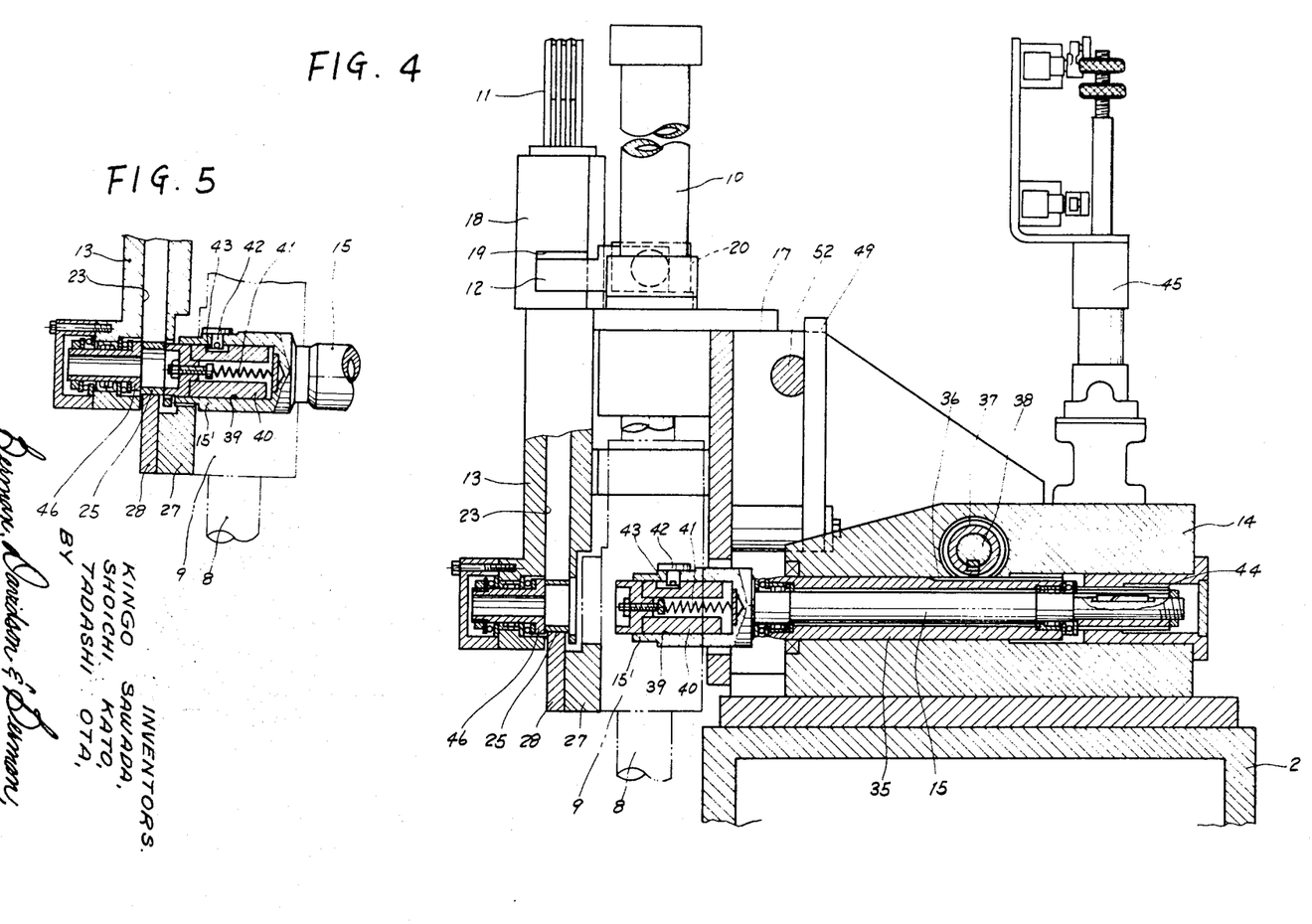
FIG. 4 is a sectional view taken along the line 4—4 of FIG. 2.
FIG. 5 shows the operation of a portion of FIG. 4.

As shown in FIG. 4, the indexing housing 14 is fixedly mounted on the column 2. A hollow shaft 35 is slidably mounted in the housing 14 and has a rack 36 engaging with a pinion 37. The pinion 37 is connected by a shaft 38 to a suitable driving means (not shown). The indexing shaft 15 is rotatably journaled in the hollow shaft 35 and has at its left end an enlarged portion 15' having a bore 39 therein. A friction shaft 40, aligned with the bearing 25 on the receiving seat 29 in its indexing position, is slidably mounted in the bore 39 and is biased outwardly by a compressed spring 41 with a relatively large spring constant so as to be extended beyond the left end of the shaft 15. A pin 42, secured to the enlarged portion 15' of the shaft 15 is engaged in a longitudinal recess 43 formed on the friction shaft 40 so as to rotate the friction shaft 40 together with the shaft 15 and to limit the movement of the shaft 40. The shaft 15 has at its right end a relatively long gear 44 engaging with a rack (not shown) which is formed on the piston rod of a hydraulic actuator 45 mounted in the housing 14. A face shaft 46 is rotatably mounted in the lower portion of the guide 13. The face shaft 46 is positioned opposite to the friction shaft 40 with respect to the bearing 25 mounted on the bearing seat 29 of the plate 28 to prevent the axial movement of the bearing 25. Thus, the clockwise rotation of the shaft 38 causes the hollow shaft 35 to move toward the bearing 25 to urge the bearing against the side face of the face shaft 46 by the force of the compressed spring 41 (FIG. 5). Subsequently, when the indexing shaft 15, and thus the friction shaft 40, is rotated more than one revolution by the operation of the actuator 45, the bearing 25 is rotated by the frictional force between the bearing 25 and the friction shaft 40.

In FIG. 2, a shaft 47 is rotatably mounted in the bracket 17. The shaft 47 has secured thereto two axially spaced arms 48 and 49. The arm 48 has at its free end an indexing pin 50. A shaft 52 is slidably, but non-rotatably mounted in the upper portion of the bracket 17 and is positioned at substantially right angles to the arm 49. One end of the shaft 52 is connected to the piston rod of a hydraulic actuator 53 secured to one side of the bracket 17. An adjustable screw 54 is connected to the other end of shaft 52 to move the arm 49 in a clockwise direction. A block 55 is secured to the shaft 52 and has therein a slidable plunger 56 which is urged outwardly by a compressed spring 116 to urge the arm 49 in a counterclockwise direction. When the shaft 52 is moved to the right position shown in FIG. 2 by the operation of the actuator 53, the adjustable screw 54 urges the arm 49, and lifts the arm 48, against the force of spring 116 in a clockwise direction to cause the indexing pin 50 to disengage from the bearing in its indexing position. On the other hand, when the shaft 52 is moved to the left position shown in FIG. 3, the arm 49, and thus the arm 48, are urged by the plunger 56 by the force of the spring 116 in a counterclockwise direction, to cause the indexing pin 50 to engage the outer surface of the bearing 25, passing through a recess 51 formed in the plate 28. Thereafter, as previously described, when the bearing 25 is rotated more than one revolution by means of the rotation of the indexing shaft 15, the indexing pin 50 is aligned with and is inserted into an oil hole 57 of the bearing 25. The insertion of the indexing pin 50 into the oil hole 57 of the bearing 25 causes the arm 49 to move slightly in a counterclockwise direction so that a limit switch 58 mounted on the bracket 17 is actuated, to ensure the indexing operation. Upon actuation of the limit switch 58, the indexing shaft 15 stops rotating and is returned to the position shown in FIG. 4. Subsequently, the shaft 15 is rotated in a reverse direction so as to be returned to its original position.

Figure 6:
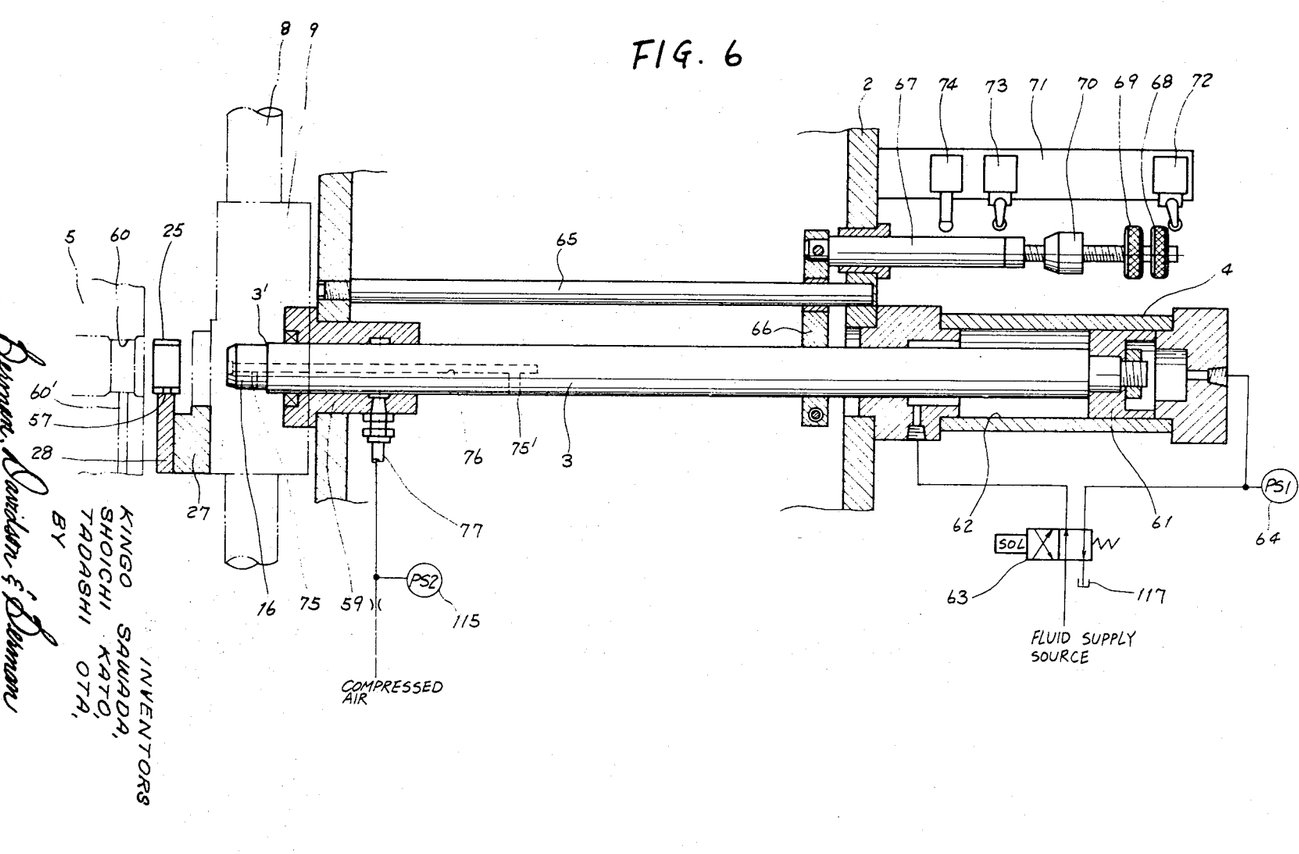
FIG. 6 is a sectional view showing a bearing press-fit mechanism.
Figure 7:
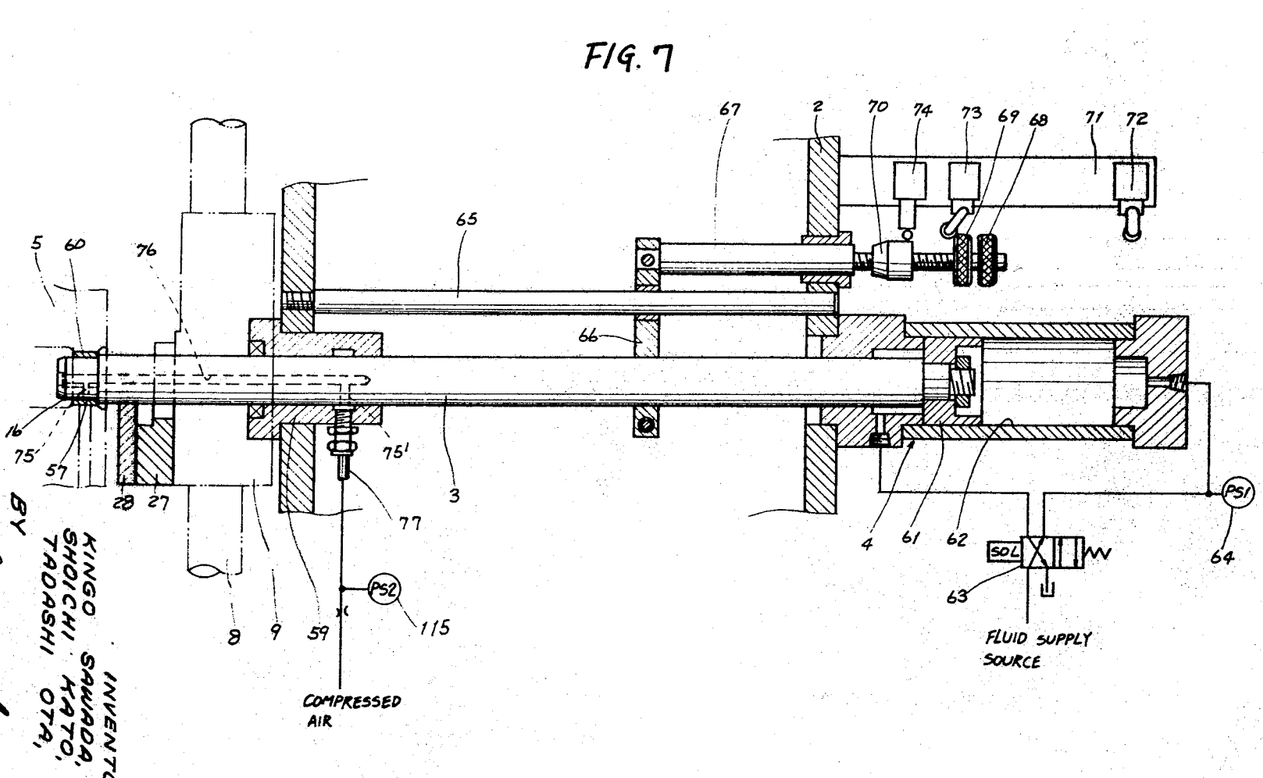
FIG. 7 is a view showing the completion of the bearing press-fit operation illustrated in FIG. 6.

Referring to FIGS. 6 and 7, the bearing press-fit mechanism and the bearing position-ensuring mechanism will be described in detail. Below the indexing shaft 15, the press shaft 3, aligned with a bore 60 of the workpiece 5 and the bearing 25 on the bearing seat 29 of the plate 28 in its inserting position, is slidably mounted in a sleeve 59 secured to the front wall of the column 2. The press shaft 3 has at its left end the press head 16, the diameter of which is smaller than that of the shaft 3, for holding the bearing 25 thereon to insert it into the bore 60 of the workpiece 5 in a predetermined angular relationship, and is connected at its right end to the piston 61 of the actuator 4 secured to the rear wall of the column 2. The piston 61 is slidably mounted in a cylinder 62 and divides it into two chambers. The chambers are connected to a fluid supply source and a sump 117 through a solenoid valve 63. A pressure switch 64 is connected to the right chamber of the cylinder 62. Above the press shaft 3, a guide shaft 65 parallel to the shaft 3 is fixedly mounted in the walls of the column 2. A plate 66 secured to the shaft 3 is slidably mounted on the guide shaft 65 for preventing rotation of the shaft 3. The plate 66 has at its upper portion a rod 67 which is slidably mounted in the rear wall of the column 2 and carries dogs 68, 69 and 70. Limit switches 72, 73 and 74 associated with the dogs 68, 69 and 70 are mounted on a plate 71 secured to the rear wall of the column 2. When fluid under pressure is supplied to the right chamber of the cylinder 62, the piston 61, and thus the press head 16, are moved to the left to hold the bearing 65. The shoulder portion 3' of the shaft 3 urges the bearing 25 into the bore 60 of the workpiece 5 in a press-fit relationship. When the bearing 25 is inserted into the bore 60 a predetermined small distance, the limit switch 74 is actuated by the dog 70. The actuation of the limit switch 74 serves to distinguish the degree of the fitting of the bearing 25 by the response of the pressure switch 64. When the press head 16 is further moved to the left, the limit switch 73 is actuated by the dog 69. Upon actuation of the limit switch 73, the solenoid valve 63 is operated so that the fluid under pressure is supplied to the left chamber of the cylinder 62 to retract the press head 16 to the position shown in FIG. 6. The rightward movement of the press head 16 causes the dog 68 to actuate the limit switch 72 for ensuring that the press head 16 is in its right position shown in FIG. 6. The press head 16 has a port 75 opening in the same angular direction as that of an oil hole 60' of the workpiece 5. The port 75 is connected through a center bore 76 to a port 75' opening at the outer surface of the shaft 3. When the shaft 3 is moved to the left position shown in FIG. 7, the port 75' is communicatively connected to a compressed air supply line 77 so that compressed air is conveyed through the center bore 76 to the port 75, and the port 75 is aligned with the oil hole 60' of the workpiece 5. A pressure control switch 115 is connected to the line 77 to ensure that the oil hole 57 of the bearing 25 is aligned with the oil hole 60' of the workpiece 5 upon the left end movement of the shaft 3.

The entire operation of the bearing press fit machine will now be described. When the conveying plate 12 is moved to the right position and is moved back to the left position shown in FIG. 2 by the operation of the hydraulic actuator 20, one of the bearings 25 drops down through the passage 23 of the guide 3 onto the bearing seat 29 of the receiving block 9 in its indexing position. The pusher 34 is moved upward by the operation of the hydraulic actuator 33 so that the clamp arm 30 clamps the bearing 25 on the seat 29 under the force of the spring 32. Thereafter the indexing shaft is moved toward the bearing 25 by means of the driving means (not shown) to urge the bearing 25 against the end of the friction shaft 40 under the force of the spring 41. At the same time, the shaft 52 is moved to the left position shown in FIG. 3 by the operation of the actuator 53 to cause the indexing pin 50 to engage with the outer surface of the bearing 25 under the force of the spring 116. When the indexing shaft 15 is rotated more than one revolution by the actuator 45, the bearing 25 is also rotated together with it by the frictional force between the bearing 25 and the friction shaft 40. During the rotation of the bearing 25, the indexing pin 50 is aligned with and inserted into the oil hole 57 of the bearing 25 (shown in FIG. 3). Upon the completion of indexing the bearing 25, the limit switch 58 is actuated so that the shaft 52 is moved to the right position shown in FIG. 2 by the operation of the actuator 53 to cause the indexing pin 50 to disengage from the bearing 25. At the same time, the indexing shaft 15 is retracted to the position shown in FIG. 4. Subsequently, the receiving block 9, guided by the shaft 8, is shifted down to the inserting position shown in FIG. 6 by the operation of the actuator 10. The press shaft 3 is moved to the left by the operation of the actuator 4 to insert the bearing 25 carried on the receiving block 9 in its inserting position into the bore 60 of the workpiece 5 in a press-fit relationship (FIG. 7). During the operation of inserting the bearing 25 into the bore 60 of the workpiece 5, compressed air is supplied from the line 77.

Upon the insertion of the bearing into the bore 60 of the workpiece 5, the compressed air is supplied to the port 75 aligned with the oil hole 60' of the workpiece 5 through the port 75' and the center bore 76. When the pressure switch 115 connected to the line 77 is not actuated during the actuation of the limit switch 74, it means that the oil hole 57 of the bearing 25 is positioned in precise angular registry with the oil hole 65 of the workpiece 5. On the other hand, when the pressure switch 115 is actuated during the actuation of the limit switch 74, an error signal, indicating that the oil hole 57 of the bearing 25 is positioned in an incorrect angular relationship with the oil hole 60' of the workpiece 5, is generated. When the bearing 25 is correctly inserted into the bore 60 of the workpiece 5, the press shaft 3 is retracted to the right position shown in FIG. 6 by the operation of the actuator 4, and thereafter, the receiving block 9 is shifted upward to its indexing position shown in FIG. 2 by the operation of the actuator 10. The pusher 34 is then moved downwardly by the operation of the actuator 33 to cause the clamp arm 30 to disengage from the tip 29' of the receiving seat 29. At the same time, the conveying plate 12 is moved to the right. The workpiece with the bearing correctly inserted is transferred to the next working station by a transfer mechanism (not shown). At the same time, the succeeding workpiece to be filled with a bearing is transferred to the press-fit position shown in FIG. 1. Thus, each successive workpiece is automatically and precisely fitted with a bearing in a press-fit relationship and with the oil hole of the bearing aligned with that of the workpiece. When the workpiece has a plurality of bores to be fitted with bearings, the remaining bores are similarly fitted with bearings in the respective successive stations.

Figure 8:
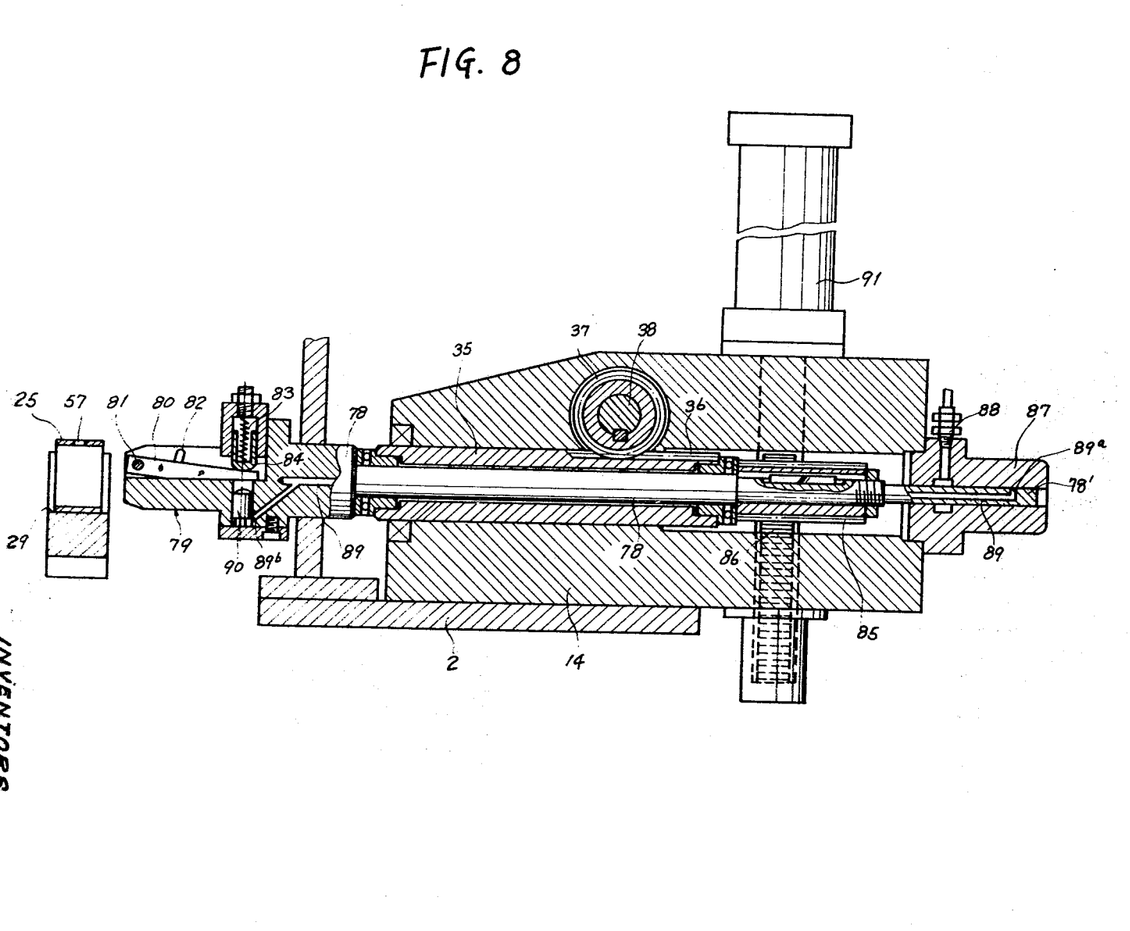
FIG. 8 is a view showing a modified indexing mechanism.

FIG. 8 shows a modified indexing mechanism. This modified embodiment is arranged to forcibly index the bearing in the predetermined angular position. A portion is similar to that of FIG. 4, and thus only parts which are different will be described. Rotatably mounted in the hollow shaft 35 is an indexing shaft 78 having at its left end a bearing fitting member 79. A link member 80 is pivotally mounted at one end thereof by a pin 81 in the bearing fitting member 79 so as to be rotatable in a radial direction of the shaft 78. The link member 80 has at its mid-portion a projection 82 extending in a radial direction of the shaft 78. The link member 80 is normally urged radially inwardly at its other end by a plunger 84 biased by a compressed spring 83 so that the projection 82 of the link member is retracted within the outer periphery of the fitting member 79. A pin 90 is radially slidably mounted opposite the plunger 84 in the fitting member 79. The indexing shaft 78 has at its right end a relatively long gear 85 which is meshingly engaged by a rack 86 formed on the piston rod of a hydraulic actuator 91. The indexing shaft 78 has also at its right end a reduced portion 78' which is slidably and rotatably mounted in a distributor 87 secured to the indexing housing 14. The indexing shaft 79 is provided with two spaced ports 89a and 89b which are connected by a center bore 89. The port 89b opens below the pin 90. The port 89a is communicatively connected to a compressed air supply port 88 provided in the distributor 87, when the indexing shaft 78 is moved to the left end of its stroke. Thus, when the port 89a is communicatively connected to the port 88 supplied with compressed air, upon the left end movement of the shaft 78, the pin 90 is moved upward against the spring 83 to cause the projection 82 to extend beyond the outer surface of the fitting member 79 so as to engage with the inner surface of the bearing 25. Subsequently, the indexing shaft 78 is rotated more than one revolution by the operation of the actuator 91. During the rotation of the shaft 78, the projection 82 is aligned with and inserted into the oil hole 57 of the bearing 25 to cause the bearing to be rotated together therewith. Thus, the bearing 25 is indexed in a predetermined angular position upon the completion of the rotation of the shaft 78. In order to ensure the completion of this indexing operation, the ensuring device having the indexing pin 50, as previously described, may be used. Namely, upon the completion of this indexing operation, the shaft 52 is moved to the left position shown in FIG. 3 by the operation of the actuator 53 to cause the indexing pin 50 to engage with the outer surface of the bearing. When the bearing is indexed in the predetermined angular position, the indexing pin 50 is inserted into the oil hole of the bearing 25 against the projection 82 therein, to thereby actuate the limit switch 58. Thus, the completion of the normal indexing operation is ensured.

Figure 9:
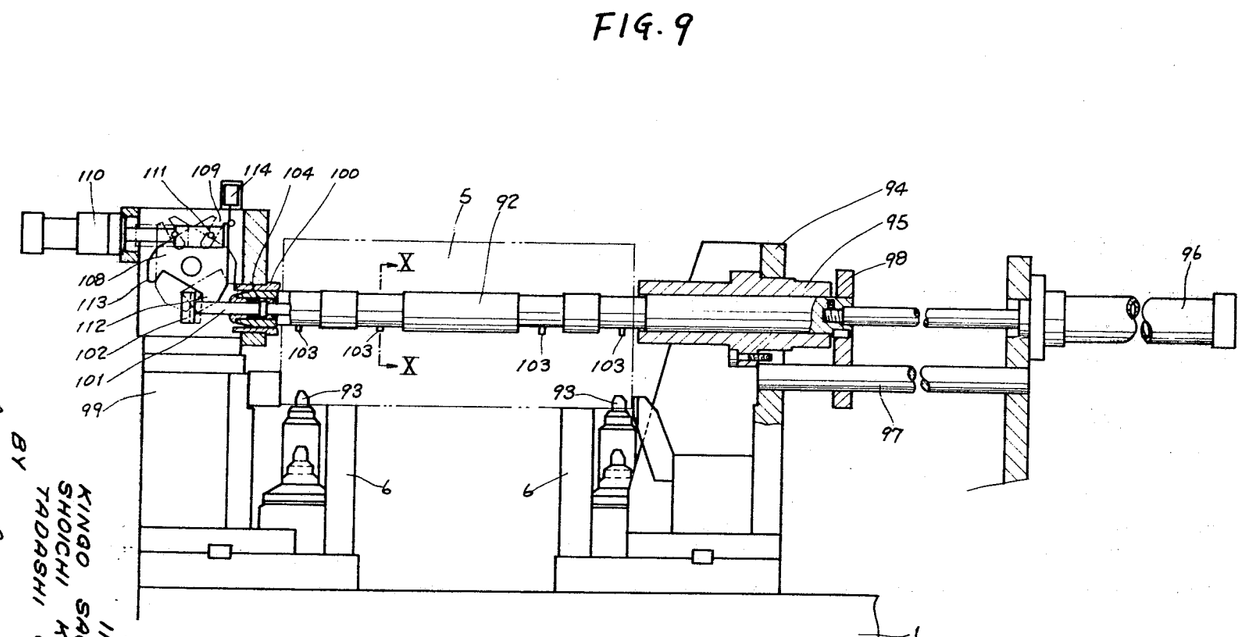
FIG. 9 is a view showing a modified bearing position-ensuring mechanism.
Figure 10:
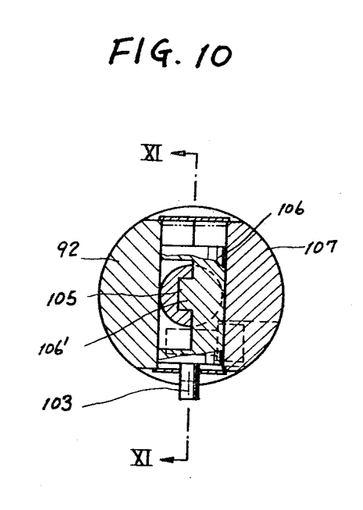
FIG. 10 is a sectional view to an enlarged scale taken along the line 10—10 of FIG. 9.
Figure 11:
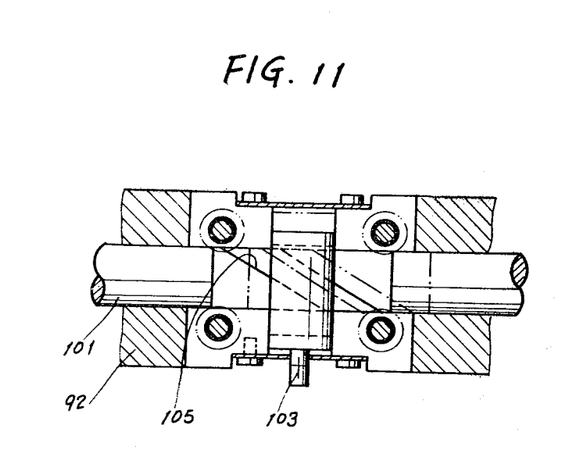
FIG. 11 is a sectional view taken along the line 11—11 of FIG. 10.

FIGS. 9 to 11 show a modified ensuring mechanism for ensuring the positioning of the oil hole of the bearing with respect to that of the workpiece. This modified embodiment intends to mechanically ensure a plurality of positions of the oil holes of the bearings, while the previous embodiment ensures the one oil hole of one bearing by the actuation of the pressure switch. Thus, in this embodiment, the press shaft 3 has no compressed air supply ports. The workpiece 5 in this embodiment has four spaced bores into which four bearings are inserted one-by-one at different stations. The workpiece 5 into which four bearings have been inserted is transferred to the bearing position ensuring station by means of a transfer mechanism (not shown).

In the ensuring station, the workpiece 5 is located by locating pins 93 and is clamped by a clamping mechanism (not shown) with four bores thereof in axial alignment with an ensuring shaft 92. A bracket 94 is fixedly mounted on the bed 1. The ensuring shaft 92 is slidably mounted in a sleeve 95 secured to the bracket 94. The right end of the shaft 92 is connected to the piston rod of a hydraulic actuator 96. A guide shaft 97 parallel to the shaft 92 is secured to the bracket 94. A plate 98 secured to the shaft 92 is slidably mounted on the shaft 97 to prevent the rotation of the shaft 92.

A support 99 is mounted on the bed 1 opposite to the bracket 94 relative to the workpiece 5. A sleeve 100 is mounted in the support 99 for supporting the left end of the shaft 92 during the leftward movement of the shaft 92. A cam shaft 101 is slidably mounted in the ensuring shaft 92 and has at its left end a flange portion 102, the diameter of which is smaller than that of the shaft 92. The cam shaft 101 has four spaced cam grooves 105 inclined with respect to the axis of the shaft 92. A cam member 106 is radially slidably mounted in the shaft 92 in the same predetermined angular direction as one of the oil holes of the workpiece 5 and has an inclined cam rib 106' arranged to engage with one of the cam grooves 105 of the cam shaft 101 for sliding in said predetermined angular direction responsive to the axial movement of the cam shaft 101. The cam member 106 has at its lower end an ensuring pin 103 associated with the oil hole of one of the bearings 25. The cam shaft is normally urged to the right with respect to the shaft 92 by the force of a compressed spring 104, and thus the ensuring pin 103 of the cam member 106 is normally withdrawn from the outer periphery of the shaft 92. However, when the cam shaft 101 is moved to the left with respect to the shaft 92 against the force of the spring 104, the ensuring pin 103 is projected beyond the outer surface of the shaft 92. For easy assembly, the ensuring shaft 92 is provided with a recess to which a cover 107 is attached after the engagement of the cam rib 106' of the cam member 106 with the cam groove 105 of the cam shaft 101.

Designated at 108 is an operating plate which is pivotally mounted on the support 99. The plate 108 has at its upper portion a long slot 109 in which a pin 111 is engaged. The pin 111 is secured to the piston rod of a hydraulic actuator 110. The plate 108 has at its lower end two opposite projections 112 and 113. When the shaft 92 is moved to its left end position as shown in FIG. 9, the flange portion 102 of the cam shaft 101 is positioned between the two opposite projections 112 and 113. Thus, when the piston rod of the actuator 110 is moved to the right, the plate 108 is turned clockwise as shown by the solid lines in FIG. 9, to move the flange 102 of the cam shaft 101 to the left with respect to the shaft 92. On the other hand, when the piston rod of the actuator 110 is moved to the left, the plate 108 is turned counterclockwise, as shown by the dotted lines in FIG. 9, to move the flange 102 of the cam shaft 101 to the right with respect to the shaft 92.

Therefore, when the workpiece is located opposite the ensuring shaft 92, the ensuring shaft 92 is moved to the left, passing through the bearing 25 inserted into the workpiece 5 by the operation of the actuator 96. Upon the movement of the shaft to the left end of its stroke, the left end of the shaft 92 is supporte din the sleeve 100 and the four ensuring pins 103 are positioned to be associated with the four bearings 25 spacedly inserted into the workpiece 5. Thereafter, the plate 108 is turned clockwise by the operation of the actuator 110, whereby to move the cam shaft 101 to the left with respect to the shaft 92 to project the ensuring pins 103 beyond the outer surface of the shaft 92. When the oil holes of the bearings are all correctly aligned with the oil holes of the workpiece, all the ensuring pins 103 are engaged in the oil holes of the bearings as shown in FIG. 9. When even one of the oil holes of the bearings is not aligned with the associated oil hole of the workpiece, the associated ensuring pin is not inserted into the oil hole of the bearing, whereby the cam shaft is prevented from moving to the left. This operation is ensured by the actuation of a limit switch 114 adapted to be actuated by the upper portion of the plate 108. When the workpiece has one bore to be fitted with one bearing, the ensuring shaft may have one ensuring pin.

As above-described, the mechanical ensuring mechanism acts to positively ensure the position of the oil hole of the bearing with respect to that of the workpiece. Since only one ensuring mechanism acts to ensure a plurality of the positions of the oil holes of the bearings which are inserted into the bores of a workpiece by a plurality of the inserting mechanism, the construction of each inserting mechanism is simplified.

While the invention has been described by means of specific embodiments, it should be understood that the novel characteristics of the invention may be incorporated in other structural forms without departing from the spirit and scope of the invention, as defined in the following claims.

What is claimed is:

1. An automatic bearing press-fit machine comprising bearing receiving means movable from an indexing position to an inserting position and having bearing clamping means, chute means for supplying a plurality of bearings, each having an oil hole, bearing conveying means for conveying and supplying one bearing after another from said chute means to said bearing receiving means in said indexing position, bearing indexing means for indexing said oil hole of said bearing mounted on said receiving means in said indexing position and clamped by sad clamping means in a predetermined angular position, shift means for shifting said receiving means carrying thereon said bearing indexed in said predetermined angular position from said indexing position to said inserting position, bearing inserting means for inserting the bearing on the receiving means in said inserting position into a bore with an oil hole of a workpiece with press-fit relationship, and bearing position-ensuring means for ensuring the alignment of the position of the oil hole of the bearing inserted into the bore of the workpiece with respect to that of the oil hole of the workpiece, whereby the bearing is automatically inserted into the bore of the workpiece in the press-fit relationship and with the oil hole of the bearing aligned with that of the workpiece.

2. An automatic bearing press-fit machine as claimed in claim 1, wherein said indexing means indexes the bearing on the receiving means in said indexing position in the predetermined angular position by means of the frictional force between the indexing means and the bearing and by means of an indexing pin positioned in said predetermined angular position, wherein said inserting means comprises a press shaft slidably but non-rotatably mounted in a sleeve secured to a housing, a press head secured to one end of the press shaft, the diameter of said press head being smaller than that of the press shaft, and driving means for moving the press head toward the bearing on the receiving means in said inserting position to insert the bearing in the bore of the workpiece, and wherein said bearing position-ensuring means comprises pressure-responsive means actuated responsive to the misalignment of the oil hole of the bearing with that of the workpiece.

3. An automatic press-fit machine as claimed in claim 2, wherein said indexing means comprises an indexing shaft slidably and rotatably mounted in a housing, a friction shaft slidably but non-rotatably mounted in one end of said indexing shaft, said friction shaft being biased outwardly beyond said one end of said indexing shaft by a compressed spring having a relatively large spring constant, second driving means for moving the indexing shaft and thus the friction shaft so as to be engaged with and disengaged from one side of the bearing on the receiving means in said indexing position and clamped by the clamping means, said clamping means including a compressed spring having a relatively small spring constant, rotatable means for engaging with the other side of the bearing in said indexing position to prevent the axial movement of the bearing, and a third driving means for rotating the friction shaft engaging with the one side of the bearing to cause the bearing to be rotated through more than one revolution by the frictional force between the friction shaft and the one side of the bearing, said indexing pin being positioned in said predetermined angular position and engaging with the outer surface of the bearing and being inserted into the oil hole of the bearing during the rotation of the bearing, and wherein said bearing position-ensuring means comprises means defining a first port in the press shaft opening adjacent to the press head, and means defining a second port in the press shaft spaced from the first port and communicatively connected to the first port of the press head, said pressure-responsive means comprising compressed air supply means connected by a line to a port in said sleeve, and a pressure swicth connected to said line, said second port of the press shaft being communicatively connected to the port of the sleeve and said first port of the press shaft being aligned with the oil hole of the workpiece upon the completion of the insertion of the bearing into the bore of the workpiece.

4. An automatic press-fit machine as claimed in claim 1, wherein said indexing means indexes the bearing on the receiving means in said indexing position in said predetermined angular position by means of the frictional force between the indexing means and the bearing and by means of an indexing pin positioned in said predetermined angular position, and wherein said inserting means comprises a press shaft slidably but non-rotatably mounted in a sleeve secured to a housing, a press head secured to one end of the press shaft, the diameter of said press head being smaller than that of the press shaft, and driving means for moving the press head toward the bearing on the receiving means in said inserting position to insert the bearing in the bore of the workpiece, and wherein said bearing position-ensuring means ensures the alignment of the oil hole of the bearing with that of the workpiece by inserting an ensuring pin aligned with the oil hole of the workpiece into the oil hole of the bearing.

5. An automatic press-fit machine as claimed in claim 4, wherein said indexing means comprises an indexing shaft slidably and rotatably mounted in a housing, a friction shaft slidably but non-rotatably mounted in one end of said indexing shaft, said friction shaft being biased outwardly beyond said one end of said indexing shaft by a compressed spring having a relatively large spring constant, second driving means for moving the indexing shaft and thus the friction shaft so as to be engaged with and disengaged from one side of the bearing on the receiving means in said indexing position and clamped by the clamping means, said clamping means including a compressed spring having a relatively small spring constant, rotatable means for engaging with the other side of the bearing in said indexing position to prevent the axial movement of the bearing, and third driving means for rotating the friction shaft engaging with the one side of the bearing to cause the bearing to be rotated through more than one revolution by the frictional force between the friction shaft and the one side of the bearing, said indexing pin being positioned in said predetermined angular position and engaging with the outer surface of the bearing and being inserted into the oil hole of the bearing during the rotation of the bearing, and wherein said bearing position-ensuring means comprises an ensuring shaft slidably but non-rotatably mounted in a housing, a cam shaft axially slidably mounted in said ensuring shaft, a cam member radially slidably mounted in said ensuring shaft and having at one end said ensuring pin positioned in the same angular direction as the oil hole of the workpiece, one of said cam shafts and said cam member being provided with a cam groove inclined with respect to the axis of the ensuring shaft, the other of said cam shafts and said cam member being provided with a cam element engaged with the cam groove, fourth driving means for moving the ensuring shaft to cause the ensuring pin to be aligned with the oil hole of the workpiece, and fifth driving means for moving the cam shaft relative to the ensuring shaft so that the ensuring pin aligned with the oil hole of the workpiece is inserted into the oil hole of the bearing.

6. An automatic press-fit machine as claimed in claim 1, wherein said indexing means forcibly indexes the bearing in said predetermined angular position by rotating an indexing pin to insert the same into the oil hole of the bearing, wherein said inserting means comprises a press shaft slidably but non-rotatably mounted in a sleeve secured to a housing, a press head secured to one end of the press shaft, the diameter of said press head being smaller than that of the press shaft, and driving means for moving the press head toward the bearing on the receiving means in said inserting position to insert the bearing in the bore of the workpiece, and wherein said bearing position-ensuring means comprises pressure-responsive means actuated responsive to misalignment of the oil hole of the bearing with that of the workpiece.

7. An automatic press-fit machine as claimed in claim 6, wherein said indexing means comprises an indexing shaft slidably and rotatably mounted in a housing and having at its one end a fitting portion to be inserted into the bore of the bearing on the receiving means in said indexing position, a link member radially pivotally mounted in the fitting portion and having said indexing pin thereon, said link member being normally biased by a compressed spring to withdraw the indexing pin from the outer surface of the fitting portion, second driving means for moving the fitting portion to be inserted into the bore of the bearing, pressure fluid supply means for supplying pressure fluid to urge the link member outwardly against the force of the spring so that the indexing pin is extended beyond the outer surface of the fitting portion to be engaged with the inner surface of the bearing, third driving means for rotating the fitting portion more than one revolution, said indexing pin engaged with the inner surface of the bearing being inserted into the oil hole of the bearing during the rotation of the fitting portion, whereby the bearing is indexed in said predetermined angular position upon the completion of the rotation of the fitting portion, and wherein said bearing position-ensuring means comprises means defining a first port in the press shaft opening adjacent the press head, and means defining a second port on the press shaft spaced from the first port and communicatively connected to the first port, said pressure-responsive means comprising compressed air supply means connected by a line to a port of said sleeve, and a pressure switch connected to said line, said second port of the press shaft being connected to the port of the sleeve and said first port of the press shaft being aligned with the oil hole of the workpiece upon completion of the insertion of the bearing into the bore of the workpiece.

8. An automatic press-fit machine as claimed in claim 1, wherein said indexing means forcibly indexes the bearing in said predetermined angular position by rotating an indexing pin to insert the same into the oil hole of the bearing, wherein said inserting means comprises a press shaft slidably but non-rotatably mounted in a sleeve secured to a housing, a press head secured to one end of the press shaft, the diameter of said press head being smaller than that of the press shaft, and driving means for moving the press head toward the bearing on the receiving means in said inserting position to insert the bearing in the bore of the workpiece, and wherein said bearing position-ensuring means ensures the alignment of the oil hole of the bearing with that of the workpiece by inserting an ensuring pin alinged with the oil hole of the workpiece into the oil hole of the bearing.

9. An automatic press-fit machine as claimed in claim 8, wherin said indexing means comprises an indexing shaft slidably and rotatably mounted in a housing and having at its one end a fitting portion to be inserted into the bore of the bearing on the receiving means in said indexing position, a link member radially pivotally mounted in the fitting portion and having said indexing pin thereon, said link member being normally biased by a compressed spring to retract the indexing pin from the outer surface of the fitting portion, second driving means for moving the fitting portion to be inserted into the bore of the bearing, pressure fluid supply means for supplying pressure fluid to urge the link member outwardly against the force of the spring so that the indexing pin is extended beyond the outer surface of the fitting portion to be engaged with the inner surface of the bearing, third driving means for rotating the fitting portion more than one revolution, said indexing pin engaged with the inner surface of the bearing being inserted into the oil hole of the bearing during the rotation of the fitting portion, whereby the bearing is indexed in said predetermined angular position upon the completion of the rotation of the fitting portion, wherein said bearing position-ensuring means comprises an ensuring shaft slidably but non-rotatably mounted in a housing, a cam shaft axially slidably mounted in said ensuring shaft, a cam member radially slidably mounted in said ensuring shaft and having at one end said ensuring pin positioned in the same angular direction as the oil hole of the workpiece, one of said cam shaft and said cam member being provided with a cam groove inclined with respect to the axis of the ensuring shaft, the other of said cam shaft and said cam member being provided with a cam element engaged with the cam groove, fourth driving means for moving the ensuring shaft to cause the ensuring pin to be aligned with the oil hole of the workpiece, and fifth driving means for moving the cam shaft relative to the ensuring shaft so that the ensuring pin aligned with the oil hole of the workpiece is inserted into the oil hole of the bearing.

References Cited

UNITED STATES PATENTS

| 3,429,021 | 2/1969 | Spiess | 29—149.5 DP |
| 3,520,045 | 7/1970 | Kuhn | 29—200 |

THOMAS H. EAGER, Primary Examiner

U.S. Cl. X.R.

29—149.5 DP, 200, 208 C